March 12, 1929.    H. D. CHURCH    1,705,046

BRAKE

Filed Oct. 14, 1925

Inventor
HAROLD D. CHURCH
by
Blackmore, Spencer & Thisle
Attorneys.

Patented Mar. 12, 1929.

1,705,046

UNITED STATES PATENT OFFICE.

HAROLD D. CHURCH, OF CLEVELAND, OHIO, ASSIGNOR TO GENERAL MOTORS CORPORATION, OF DETROIT, MICHIGAN, A CORPORATION OF DELAWARE.

BRAKE.

Application filed October 14, 1925. Serial No. 62,444.

This invention relates to brakes and is more particularly intended for use on vehicles, although its use is clearly not so restricted.

The object of the invention is to produce an improved band brake. A special object is to construct a band brake wherein the operating means for the band is capable of a slight circumferential movement. This results in an equalized application of the brake band halves around the rotating drum. Further objects will be apparent from the reading of the following specification associated with the accompanying drawing.

On the drawing Figure 1 is a front elevation of the brake mechanism, the drum to which the bands are applied being shown in section.

Figures 1, 2:
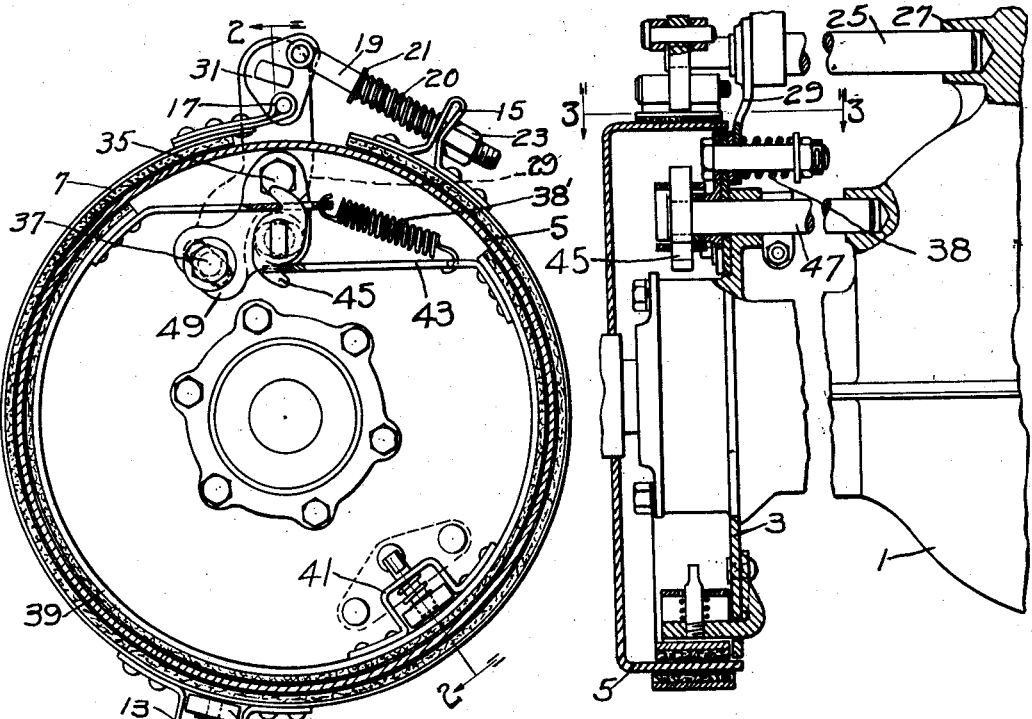
Figure 2 is a substantially vertical section on line 2—2 of Figure 1.
Figures 3, 6:
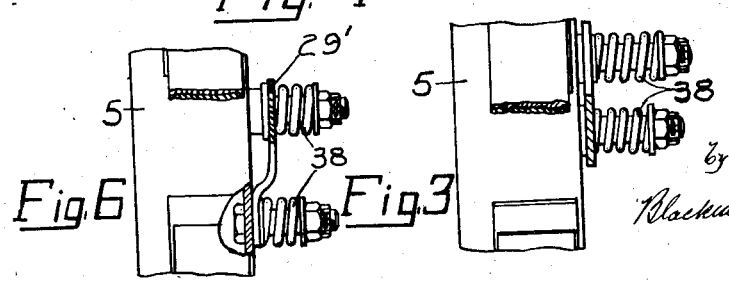
Figure 3 is a section on line 3—3 of Figure 2.
Figure 6 is a section on line 6—6 of Figure 5.

Referring first to Figures 1 to 3 of the drawing, reference numeral 1 represents the rear axle housing of a vehicle and 3 a stationary plate carried thereby closing the opening of the usual brake drum 5 to be secured to the vehicle wheel. It will be understood that although the drum 5 and plate 3 are described in their relation to vehicles, these parts are not limited to use on vehicles it merely being necessary to locate the drum and plate on parts one of which has rotary movement relative to the other which movement is to be checked and stopped.

An external band 7 is shown encircling the drum. This band is provided with anchoring means consisting of a U shaped part 9 riveted thereto, and positioning the band by engagement with a projection 11 from the plate 3. A spring 13 serves to normally space the band away from the drum. One end of the band carries an apertured boss 15 and the other is provided with a pivot eye 17. A link 19 passes through the apertured boss 15 and around this link is a coiled spring 20, located between the boss and an abutment 21 on the link. An adjusting nut 23 is threaded on the end of the link and engages the opposite side of the boss.

A horizontal rock shaft 25 is mounted at its inner end on the axle as at 27, and at its outer end is carried rotatably in an angular link 29. The outer end of the shaft is provided with a disc 31 having pivot pins for the end of the link 19 and for the eye 17. The angular link carrying the shaft 25 is pivoted to the plate 3 by a pivot pin 35. The link 29 has an extended arm which is slotted to engage over a second pin 37 the pin and slot limiting the swinging of the link 29 on its pivot 35. Surrounding the pins 35 and 37 are coiled springs 38 in abutment with the link and with adjusting nuts on the ends of pins 35 and 37 to hold the lever frictionally against plate 3 in its adjusted positions.

It will be seen that upon rotation of shaft 25 the band is drawn into engagement with the drum, but that owing to the swinging link 29 a limited circumferential movement of the means for applying the band is possible. This arrangement makes possible an equalization in the application of the drum of the two halves of the band. If the parts are so positioned or if through long continued use one portion of the band tends to engage the drum before the other, there will result the swinging of the link so that an equal application of the two halves of the band will automatically be effected. Sufficient clearance is provided at the inner end of the shaft to accommodate the swinging of the link.

A similar arrangement is made use of in connection with the internal drum and certain parts used in the external brake arrangement are made use of in the adoption of the swinging link expedient in connection with the internal brake, thus simplifying the brake structure as a whole. The internal band is designated by numeral 39. An anchor is shown at 41 which is similar to the anchor for the external brake. This anchor need not be further described being well shown in Figure 1 and Figure 2. Straps 43 are secured to the adjacent ends of the band and engaged by a double cam shaped member 45. The part 45 is carried on the end of a rock shaft 47. This rock shaft 47 is journaled at one end from the axle as in the case of shaft 25. It passes through plate 3 and is mounted in a link 49 swinging on pivot 35. The link 49 is shaped so as to surround pin 37 and is provided with a limiting slot as in the case of link 29. It will be observed best by reference to Figure 2 that the springs function to hold both links in position one against each face of plate 3 and to retain the links in any position of adjustment. A spring 38 is used to release the internal band and is connected preferably to an extended end of one of the straps near the cam and to the other strap near its connection with the band.

Figure 4:
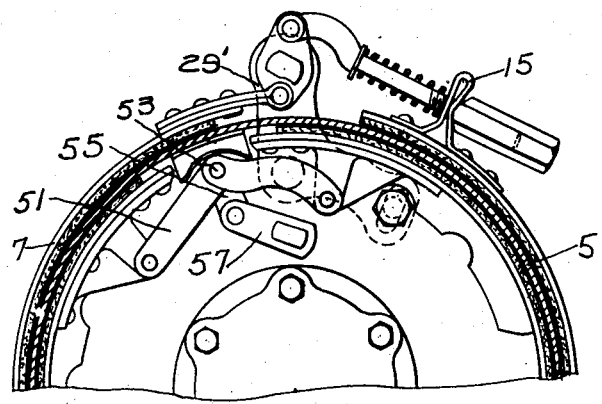
Figure 4 is a view similar to Figure 1 but showing a modified form.
Figure 5:
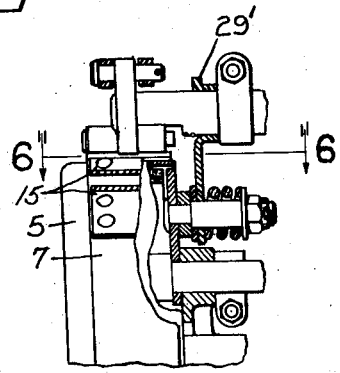
Figure 5 is a side elevation, parts being in section.

In Figures 4 to 6 inclusive is shown a brake organization quite similar in so far as the external contracting brake is concerned, but employing an internal expanding band having a different operating means. In this form of the invention as a matter of convenience the slotted arm of lever 29′ is disposed in a direction opposite to that shown by Figure 1. The circumferential movement of the band operating means is provided as in the form first described. Within the drum a toggle is employed to expand the internal band. This mechanism employs links 51 which are pivoted together at 53 and connected at their remote ends to the adjacent ends of the internal band. A link 55 operated by a suitable lever arm 57 functions to move the toggle and apply the internal brake.

From the above description it will be understood that a limited circumferential movement of the means for applying the brake is made possible in the case of band brakes and that this action may be obtained in either the external or internal brake or in both and that when the idea is embodied in both brakes it is possible to employ certain parts in common for both brakes to the end of simplifying the structure and avoiding unnecessary parts. A brake having these characteristics is not likely to grip the band, its application is gradual and it serves to equalize the application of the two portions of the band upon the drum.

What I claim and desire to protect by Letters Patent is:

1. In a brake, a drum, a stationary closure plate, an external brake, an internal brake, a pivot bolt on the closure plate, links pivoted on the pivot bolt one extended radially beyond the drum and carrying a rock shaft to operate the external brake, and one extending inwardly and carrying a parallel rock shaft to operate the internal brake.

2. A brake as in claim 1 having means common to the two links to provide a limited movement for the links.

3. A brake comprising a drum, a stationary closure plate, a brake, a link pivoted to the closure plate, operating means for the brake carried by the link, and a pin and slot connection between the link and the closure plate to give the operating means a limited circumferential movement.

4. A band brake as in claim 3 wherein a spring is associated with the pivot bolt of the spring to hold the link firmly against the closure plate.

5. A band brake as in claim 3 wherein springs surround the pivot bolt and the pin and slot connection to hold the link firmly against the closure plate.

6. The combination of a brake drum, an internal brake, an external brake, a stationary support adjacent the drum, parallel rock shafts for operating said brakes to cause them to engage the drum, supports for said rock shafts mounted on opposite sides of the stationary support and permitting limited circumferential movement of said parallel rock shafts.

7. In the combination as defined in claim 6 said supports comprising links having a common pivot.

8. In the combination as defined in claim 6, means common to said supports for limiting circumferential movement thereof.

9. In the combination as defined in claim 6, means for limiting the circumferential movement of said supports comprising slots in the supports and a bolt mounted in the stationary support and fitting loosely in said slots.

10. The combination of a brake drum having a stationary closure plate, a brake, a link pivoted to the closure plate, operating means for the brake carried by the link, the link having an arm extending away from its pivot, and stop means associated with the arm and plate to permit the operating means to have limited circumferential movement.

11. The combination of a brake drum, brake means, a rockable member operably related to the ends of the brake means for causing it to engage the drum, a support for said rockable member permitting circumferential movement thereof, and means for limiting the circumferential movement of said support.

In testimony whereof I affix my signature.

HAROLD D. CHURCH.